(12) United States Patent
Prakash et al.

(10) Patent No.: US 6,704,633 B2
(45) Date of Patent: *Mar. 9, 2004

(54) POSITION SENSING DEVICE AND SHIFT DEVICE FAULT MANAGEMENT IN AN ELECTRONIC SHIFT FOUR-WHEEL DRIVE SYSTEM

(75) Inventors: Rajiva Prakash, Canton, MI (US); Vincent F. Amantangelo, Northville, MI (US)

(73) Assignee: Ford Global Technologies, LLC, Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/564,967

(22) Filed: May 4, 2000

(65) Prior Publication Data

US 2003/0120411 A1 Jun. 26, 2003

Related U.S. Application Data

(60) Provisional application No. 60/132,462, filed on May 4, 1999.

(51) Int. Cl.$^7$ .............................................. G06F 17/00
(52) U.S. Cl. ....................................................... 701/69
(58) Field of Search .................. 701/51–52, 62–64, 701/69, 76, 92; 180/233–234, 65.1, 292–294, 412–413, 443–445; 74/473.21–473.4

(56) References Cited

U.S. PATENT DOCUMENTS

| | | | | | |
|---|---|---|---|---|---|
| 4,782,907 A | * | 11/1988 | Morishita et al. | ............ | 180/412 |
| 5,092,417 A | * | 3/1992 | Oslapas | ...................... | 180/446 |
| 5,150,637 A | * | 9/1992 | Ninomiya et al. | ............. | 74/335 |
| 5,522,776 A | * | 6/1996 | Alvey | .......................... | 477/35 |
| 5,754,970 A | * | 5/1998 | Takasaki et al. | ............... | 701/87 |
| 5,884,526 A | * | 3/1999 | Fogelberg | ..................... | 74/335 |
| 5,964,680 A | * | 10/1999 | Salecker et al. | ............... | 477/74 |
| 6,073,507 A | * | 6/2000 | Ota et al. | ....................... | 74/335 |
| 6,145,398 A | * | 11/2000 | Bansbach et al. | .............. | 74/335 |

FOREIGN PATENT DOCUMENTS

JP 2-193725 * 7/1990 ........... B60K/23/08

* cited by examiner

Primary Examiner—Thu V. Nguyen
(74) Attorney, Agent, or Firm—David B. Kelley

(57) ABSTRACT

A system and method are provided for managing faults in position sensing device and shift device; such faults are the unwarranted code change, power loss fault, and channel fault. The faults correspond to those that either turn it on without a command from the controller or those that do not allow it to turn on despite a command from the controller. The limited operation actions under these fault conditions constitute disabling shifting, enabling shifting until a mainstop is reached, and/or railing on two-wheel side. There are alternatives in reset mechanism, namely, maintaining the limited operation mode until service, reset upon ignition key going from OFF to RUN, key going from START to RUN, or a simple change in Mode Select Switch after limited operation action of the controller, etc. Auto-reset under conditions of auto-fault recovery are also included.

14 Claims, 2 Drawing Sheets

* Ignition key, brake-switch, PRNDL/Clutch, and Vehicle speed

| Enc_Chnl_P | Enc_Chnl_B | Enc_Chnl_C | Enc_Chnl_A | Decimal Equ. [P B C A] | Enc_Pos |
|---|---|---|---|---|---|
| Gnd (1) | Vbat (0) | Gnd (1) | Vbat (0) | 10 | 4L |
| Vbat (0) | Vbat (0) | Gnd (1) | Vbat (0) | 2 | BG4 |
| Vbat (0) | Gnd (1) | Gnd (1) | Vbat (0) | 6 | BG3 |
| Gnd (1) | Gnd (1) | Gnd (1) | Vbat (0) | 14 | N |
| Vbat (0) | Gnd (1) | Gnd (1) | Vbat (0) | 6 | BG3 |
| Vbat (0) | Gnd (1) | Vbat (0) | Vbat (0) | 4 | BG2 |
| Gnd (1) | Gnd (1) | Vbat (0) | Vbat (0) | 12 | 4H |
| Vbat (0) | Gnd (1) | Vbat (0) | Vbat (0) | 4 | BG2 |
| Vbat (0) | Gnd (1) | Vbat (0) | Gnd (1) | 5 | BG1 |
| Gnd (1) | Gnd (1) | Vbat (0) | Gnd (1) | 13 | 2H |
| Gnd (1) | Gnd (1) | Gnd (1) | Gnd (1) | 15 | INVALID |
| Gnd (1) | Vbat (0) | Gnd (1) | Gnd (1) | 11 | INVALID |
| Gnd (1) | Vbat (0) | Vbat (0) | Gnd (1) | 9 | INVALID |
| Gnd (1) | Vbat (0) | Vbat (0) | Vbat (0) | 8 | INVALID |
| Vbat (0) | Gnd (1) | Gnd (1) | Gnd (1) | 7 | INVALID |
| Vbat (0) | Vbat (0) | Gnd (1) | Gnd (1) | 3 | INVALID |
| Vbat (0) | Vbat (0) | Vbat (0) | Gnd (1) | 1 | INVALID |
| Vbat (0) | Vbat (0) | Vbat (0) | Vbat (0) | 0 | INVALID |

Figure 3

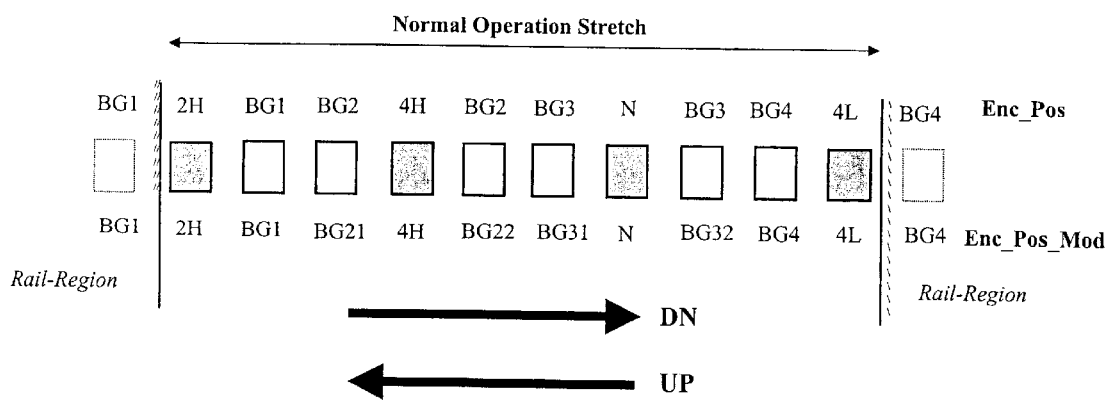

Figure 4

POSITION SENSING DEVICE AND SHIFT DEVICE FAULT MANAGEMENT IN AN ELECTRONIC SHIFT FOUR-WHEEL DRIVE SYSTEM

This application claims benefit of Provisional No. 60/132,462 filed May 4, 1999.

FIELD OF THE INVENTION

The present invention relates to an electronically shifted four wheel drive system for an automotive vehicle, and more particularly to a system and method for fault management with respect to the faults in position sensing device and the shift device.

BACKGROUND OF THE INVENTION

Four wheel drive systems include Electronically Shifted and mechanically shifted four wheel drive systems. Certain of such electronically controlled systems may be shifted on the fly; meaning thereby there is a microprocessor that controls the shifting. Alternatively, there are Mechanical shift on the fly (MSOF) systems that operate with a manual lever and don't have an electronically controlled unit.

In an electronically controlled system, certain faults are detected and the microprocessor controls the shift device to take appropriate action in the presence of such faults. However, faults in position sensing device and shift device are very important and typically are not addressed in a robust manner. It would be desirable to provide a system and method which adequately manages faults in position sensing device and shift device to ensure logical and safe response.

SUMMARY OF THE INVENTION

Accordingly, the present invention provides a system and method to manage sensing device faults and shift device faults. In a system according to the present invention, a micro-processor is provided to enable accurate, safe, reliable, and fault-tolerant operation. More particularly, the present invention provides fault management methods for different faults in position sensing device and shift device.

According to the present invention, a system and method are provided for taking appropriate action in the face of faults detected in the system components, namely, position sensing device and the shift device.

BRIEF DESCRIPTION OF THE DRAWINGS

FIG. 3 is a Gray Code Table for the Encoder States for the encoder of FIG. 2.

FIG. 4 is a schematic representation of the Transfer Case States as Seen by the Encoder of FIG. 2 and the convention used for the direction of the motor.

DETAILED DESCRIPTION OF THE PREFERRED EMBODIMENTS

Figure 1:
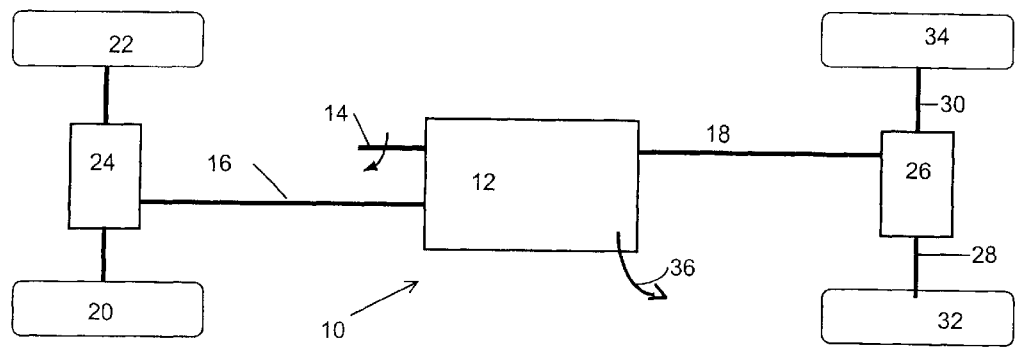
FIG. 1 is a schematic representation of a four wheel drive motor vehicle according to the present invention.

FIG. 1 provides a simplified schematic representation of the primary mechanical parts of a four wheel drive (4×4) vehicle 10. The main mechanical component of the four wheel drive system is a transfer case 12. The transfer case 12 has three shafts 14, 16, 18 connected thereto, namely an input shaft 14 that receives power and torque from the prime-mover (not shown, including the engine and transmission), the front driveshaft 16, and the rear driveshaft 18. The front driveshaft 16 is connected to the front wheels 20, 22 through a front differential 24. Similarly, the rear driveshaft 18 is connected to a rear differential 26, the output of which is split into left and right half shafts 28, 30, respectively, that drivably connect to the rear wheels 32, 34.

As known to one skilled in the art, the transfer case 12 is shiftable into various modes, including 2WD (two-wheel-drive) with a high gear ratio, 4WD (four-wheel-drive) with a high gear ratio, or 4WD (four-wheel-drive) with a low gear ratio. The names of these gears are short-handed as "2H", "4H", and "4L", respectively. The transfer case 12 preferably further includes a Neutral (N) position to decouple both front axle and rear driveshafts 16, 18 from the input shaft 14. The electrical connections 36 are represented schematically in FIG. 2.

Figure 2:
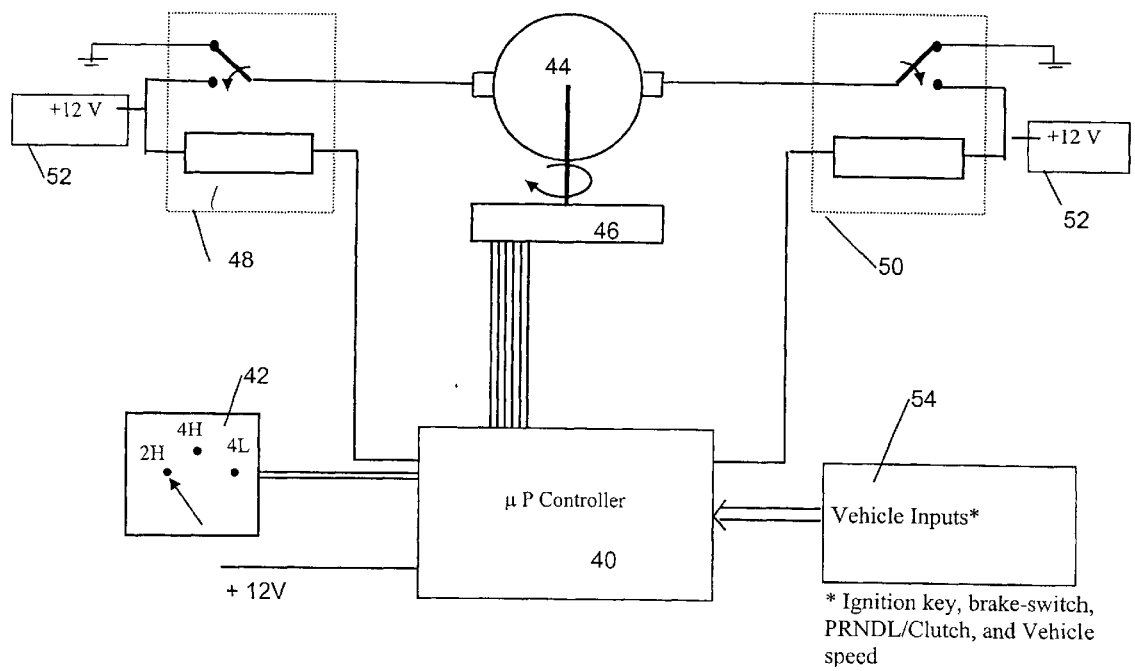
FIG. 2 is a schematic representation of an electrical system for the four wheel drive system of FIG. 1.

FIG. 2 schematically represents the electrical components and their interconnections for the system. A micro-processor controller 40 (referred herein as either the controller or processor) is the central device that makes the whole system operate. The control strategy resides in the processor 40 in form of software in a known manner.

The driver commands the transfer case 12 to a selected mode through a known Mode Select Switch 42 (MSS). The MSS 42 sends a signal based on the driver's request to the processor 40. The transfer case motor 44 and encoder 46 are physically part of the transfer case 12 itself shown in FIG. 1. The encoder 46 is preferably an absolute-position type encoder that sends information to the processor 40 about the exact position of the motor 44 and thereby the current gear of the transfer case 12. Two relays 48, 50 are provided for the transfer case motor 44, a first relay 48 for up-shift and the other relay 50 for down-shift. Each relay 48, 50 has one end connected to a battery 52 and the other end is connected to the processor 40. The processor 40 grounds a relay 48, 50 in order to energize the relay 48, 50, and, in effect, to turn the motor 44 in a given direction corresponding with the selected mode of the MSS 42.

The values of the encoder position are described here with respect to a preferred encoder exemplified by FIG. 3, which illustrates the encoder position gray code. In this application, as illustrated in FIG. 3, "BG" stands for "Between Gear". It is noteworthy that on each side of 2H, 4H, N, and 4L, the codes are identical. 2H, 4H, N, and 4L have P-chnl as GND and BG1, BG2, BG3, and BG4 have P-chnl as Vbat. UNKNOWN value exists until debouncing is complete, starting from initialization. When the processor wakes up from sleep mode, the encoder reading starts from UNKNOWN value and goes through debouncing. The debouncing period is a length of time to wait before encoder values are read so as to avoid erroneous input. Preferably, the "awake mode" is any time in which the controller is not in sleep mode or turned "off".

As shown in FIG. 1 to FIG. 2, the processor 40 also receives a plurality of vehicle inputs 54, including the position of the ignition key, whether the brake is engaged (from the brake switch), in which position the automatic transmission is engaged or whether the clutch is depressed in a manual transmission, the vehicle speed, and others. First, the Ignition key state (RUN, START, OFF, ACC) is input into the processor 40 and is used in the control logic. The controller 40 also needs to know whether the driver's foot is on brake, which gear of the automatic transmission has been selected (or, in case of manual transmission, whether clutch is pressed), and the vehicle speed value in order to determine whether shifting through transfer case Neutral (shifting between 4H and 4L) should be performed.

The present invention primarily addresses faults in two devices: the encoder (46), to be called hereafter as, Position Sensing Device and the Shift Device, which constitutes relays (48, 50) and the motor (44) in FIG. 2.

The first fault in the encoder corresponds to an unwarranted code change. When the motor is at a main-stop, i.e., in a proper driveable position of the transfer case, namely, 2H, 4H, or 4L, the motor has not been energized by the controller, and the position sensor code changed by itself, then the fault is the unwarranted code change fault. We will refer to the associated Fault Flag No. 1 for convenience which gets set when the stated conditions are met. Also, as soon as the position sensor code returns to the original main-stop value with motor not energized by the controller, the said flag (Fault Flag No. 1) is reset. To illustrate this fault, a few examples are taken making reference to the gray code table as in FIG. 3.

If the initial code is 2H and A channel goes open-circuit then the code read by the controller will be 4H.

If the initial code is 4H and C channel undergoes a short-to-ground fault then the code read by the controller will be N.

The Fault Flag no. 1 is set due to any of the following failures taking place while no relay was commanded on by the micro-processor:

Open-circuit (OC) fault in an encoder channel

Short-to-ground (SG) fault on an encoder channel

Short-to-Battery (SB) fault on an encoder channel

Power-failure, i.e., power line to encoder open- or short-circuited to ground.

In the preferred embodiment, the system is also provided with the added feature of possessing a detection mechanism for detecting motor fault on each side. In a low cost implementation, the said detection mechanism, however, will not be able to discern "on-fault" from "off-fault". In other words, the said detection mechanism merely finds that a given side of the motor has a fault; that fault could be "on-fault" or "off-fault". The fault flag for the fault on the "UP-side" will be called "Fault Flag No. 2" while the fault flag for the fault on the "DOWN-side" will be called "Fault Flag No. 3". For example, in FIG. 2, if a relay coil (48 or 50) undergoes an open-circuit fault or short-to-ground fault, one of these fault flags will get set.

With a little more hardware and the resulting cost, it is possible to discern between "on-fault" from "off-fault". The fault flags for the "on-fault" on the "UP-side", the "off-fault" on the "UP-side", the "on-fault" on the "DOWN-side", and the "off-fault" on the "DOWN-side", will be called "Fault Flag No. 4", "Fault Flag No. 5", "Fault Flag No. 6", and "Fault Flag No. 7", respectively. These faults are monitored on continuous basis and the corresponding fault flags are set or reset by the controller. For the sake of illustration, assume that the system of FIG. 2 has a motor current sensor. Further assume that one of Fault Flag No. 2 and Fault Flag no. 3 is set. In this situation, if motor is drawing current then it is the "on-fault"; if there is no current drawn then it is the "off-fault".

In the preferred embodiment, the system is further equipped with the mechanism of detecting position sensing device power loss fault. Either of open-circuit or short-to-ground fault in the position sensing device sets the corresponding fault flag that will be called here as "Fault Flag No. 8". The detection mechanism operates continuously regardless of whether the motor is energized or not.

Coming back to position sensing device (encoder) faults, OC, SG, or SB fault will cause Unwarranted code change fault flag to be set only if the encoder value gets changed because of the fault. It can be seen that sometimes a given type of fault in a given channel will be transparent while the motor is at a given position.

Thus, an encoder channel fault is included in the system. This fault is declared while the motor turns during shift-mission(s). This fault flag is caused by encoder channel failure(s), namely, OC, SG, or SB and is set only while the motor is in motion. If the encoder channel failure takes place with relays off, in some cases, the fault will be a transparent one and Unwarranted code change flag (Fault Flag No. 1) will not be set. In such cases, when the motor is commanded to move for accomplishing shifts, incorrect/illogical codes received will set the encoder channel fault flag. The other possibility is that while the motor is moving, the encoder failure takes place and as stated, improper codes set the fault flag.

In this feature, whenever the motor is energized, the controller observes the position sensing device codes and evaluates its health. The corresponding fault flag will be referred to as "Fault Flag no. 9" which is set when the controller determines that the encoder channels are bad.

At this point, the controller's actions in the stated fault conditions will be given. But, before that, a few definitions will be made as they will be used repeatedly in the descriptions to follow. Whenever the defined keywords are used, they are put in double quote marks.

RAILING: "Railing" is to mean forcing the motor to go towards rail near 2H. The motor is energized by the controller in the corresponding direction. For "railing", the motor is energized in the stated direction for a fixed amount of time, regardless of the position of the motor.

NORMAL SHIFTING: "Normal Shifting" means actions of the controller to perform shifting in the event of no fault. It consists of energizing the motor in proper direction to attain the position of the transfer case as requested by the driver through mode select switch. Gear hunting is a part of "normal shifting" as there might be a temporary blockage in the transfer case.

DISABLE SHIFTING: "Disabling shifting" means not allowing motor to turn in response to any command from Mode Select Switch. No shift command is entertained; they are suppressed.

TYPE 1 KEY CYCLING: Ignition key cycling from OFF to RUN position will be called "Type 1 Key Cycling".

TYPE 2 KEY CYCLING: Ignition key cycling from START to RUN position will be called "Type 2 Key Cycling".

Now, We claim:

Limited operation actions will be detailed now.

If the Fault Flag No. 1 is set then "Disable Shifting" action is taken; if the Fault Flag No. 1 is reset then the system response is "Normal Shifting".

In a preferred embodiment, the possibility of Neutral code can be handled in one of two ways. First method is described by the following three sub-steps:

If Fault Flag No. 1 is set and the position sensing device does not read Neutral, then "Disable Shifting" action is taken.

If Fault Flag No. 1 is set and the position sensing device reads Neutral, then a shift command is issued to turn the motor to 4H position, according to the position sensing device.

If Fault Flag No. 1 is reset, then the system reverts to "Normal Shifting" mode.

The second way of handling the Neutral code would be:
If Fault Flag No. 1 is set and the position sensing device does not read Neutral, then "Disable Shifting" action is taken.
If Fault Flag No. 1 is set and the position sensing device reads Neutral, then "railing" action is taken;
If Fault Flag No. 1 is reset, then the system response is "Normal Shifting".

In a preferred embodiment, the unwarranted code fault will be reset in one of the following conditions: "Type 1 Key Cycling", or "Type 2 Key Cycling", or when mode select switch (MSS) position is changed. Thus, upon the stated condition, the LOS action will be terminated and normal operation of the system will resume.

Now, the actions on relay/motor faults (shift device faults) will be described. If Fault Flag No. 2 or Fault Flag No. 3 is set while the motor is not energized by the controller then "Disable Shifting" action is taken; if both Fault Flag No. 2 and Fault Flag No. 3 are reset then the system response is "Normal Shifting". This is a simple alternative. But, in a preferred embodiment, three sub-steps are incorporated to take care of the possibility of Neutral code.

If either Fault Flag No. 2 or Fault Flag No. 3 is set while the motor is not energized by the controller and the position sensing device does not read Neutral, then "Disable Shifting" action is taken.

If either Fault Flag No. 2 or Fault Flag No. 3 is set while the motor is not energized by the controller and the position sensing device reads Neutral, then a shift command is issued to turn the motor to 4H position; failure in reaching 4H makes the motor to be energized by the controller in opposite direction with 4L as the destination.

If both Fault Flag No. 2 and Fault Flag No. 3 are reset while the motor is not energized by the controller, then the system responds by "Normal Shifting".

The preferred LOS actions for the case of discerned on/off fault are described by the following table.

| | Flag that's set | | | |
|---|---|---|---|---|
| Position sensor code | Fault Flag No. 4 (On-fault on Up-side) | Fault Flag No. 6 (On-fault on Down-side) | Fault Flag No. 5 (Off-fault on Up-side) | Fault Flag No. 7 (Off-fault on Down-side) |
| Main-Stop (2H, 4H, or 4L) | Energize the motor on both sides together | Energize the motor on both sides together | "Disable Shifting" action | "Disable Shifting" action |
| Other than Main-Stop | "Normal Shifting" | "Normal Shifting" | "Normal Shifting" | "Normal Shifting" |

Furthermore, if none of Fault Flag No. 4, Fault Flag No. 5, Fault Flag No. 6, and Fault Flag No. 7 is set then there is "normal shifting" action.

As before, the resetting will be done in anyone of the conditions as chosen: "Type 1 Key Cycling", or "Type 2 Key Cycling", or when mode select switch (MSS) position is changed. Thus, upon the stated condition, the LOS action will be terminated and normal operation of the system will resume.

Now will be described the responses to encoder power loss fault. If Fault Flag No. 8 is set while the motor is not energized by the controller then position sensing device code just before the fault is recorded and the action taken is as per the following table:

| Position sensor code just prior to the fault | Response |
|---|---|
| Main-Stop (2H, 4H, or 4L) | "Disable Shifting" action |
| Other than Main-Stop | "Railing" action, followed by "Disable Shifting" action | if Fault Flag No. 8 is reset then "Normal Shifting" resumes.

Further, if Fault Flag No. 8 is set while the motor is energized by the controller then the motor is immediately de-energized and "railing" action is undertaken; furthermore, if Fault Flag No. 8 is reset then "Normal Shifting" resumes.

For the encoder channel fault, if Fault Flag No. 9 is set then "railing" action is taken, followed by "disable shifting" action; if Fault Flag No. 9 is reset then "Normal Shifting" resumes. The reset will take place as usual, upon one of the three conditions described before.

What is claimed is:

1. A transfer case shifting assembly comprising:
a motor which is selectively movable to one of a plurality of positions;
a single rotational position sensor which is coupled to said motor and which continuously monitors the exact position of said motor and which selectively produces a signal; and
a controller which is coupled to said sensor, which receives said signal, and which at least temporarily prevents said motor from being selectively movable to one of said plurality of positions in response to said receipt of said signal; and wherein said controller receives a shift command and selectively moves the motor to a second one of the said plurality of positions in response to the receipt of the shift command; and wherein said controller determines whether said motor currently resides within a driving position, determines whether the signal from said sensor corresponds to a neutral shifting position, determines the existence of a certain fault based upon said determinations, and moves said motor to a four wheel drive position and then at least temporarily prevents said motor from further moving.

2. The shifting assembly of claim 1 wherein said controller determines whether said motor currently resides within a driving position and wherein said controller determines whether the signal from said sensor has changed when the motor was unenergized and wherein said controller determines the existence of a certain sensor fault based upon said determinations.

3. The shifting assembly of claim 1 wherein said sensor includes a power supply which supplies electrical power to said sensor and wherein said controller is adapted to detect whether said supply of electrical power is interrupted.

4. The shifting assembly of claim 3 wherein said controller determines whether said motor currently resides within a driving position while said motor is unenergized and determines whether said supply of electrical power to said sensor is interrupted and, based upon said determinations, said controller determines the existence of a certain power interruption fault.

5. The shifting assembly of claim 1 wherein said sensor is coupled to said controller by at least one wire and wherein said controller senses a fault within said at least one wire.

6. The shifting assembly of claim 5 wherein said controller determines whether said motor is in a driving position while said motor is unenergized and said controller determines whether said signal is erroneous and, based upon said determinations, said controller determines the existence of a certain signal error fault.

7. The shifting assembly of claim 1 further comprising an energizing member which selectively moves said motor to an up side and to a down side and wherein said controller detects at least one fault within said energizing member.

8. The shifting assembly of claim 7 wherein said controller determines whether said motor is unenergized and detects a fault within the energizing member and, based upon said determinations, said controller determines the existence of a certain energizing member fault.

9. The shifting mechanism of claim 7 wherein said controller determines whether said motor is energized and detects a fault within the energizing member and, based upon said determination, identifies the existence of a certain energizing member fault and allows the motor to be selectively shifted without at least temporarily preventing said movement of said motor.

10. A transfer case shifting assembly comprising:
a motor which is selectively movable to one of a plurality of positions;
a single rotational position sensor which is coupled to said motor, continuously monitors the exact position of said motor, selectively produces a signal, and includes a power supply which supplies electrical power to said sensor; and
a controller which is coupled to said sensor, receives said signal, is adapted to detect whether said supply of electrical power is interrupted, and at least temporarily prevents said motor from being selectively movable to one of said plurality of positions in response to said receipt of said signal; and wherein said controller receives a shift command and selectively moves the motor to a second one of the said plurality of positions in response to the receipt of the shift command; and wherein said controller determines whether said motor currently resides within a neutral position while said motor is unenergized and determines whether said electrical power which is supplied to said sensor is interrupted and, based upon said determinations, said controller determines the existence of a certain power interruption fault and rails the motor to a two-wheel drive position and at least temporarily prevents further movement of said motor.

11. A transfer case shifting assembly comprising:
a motor which is selectively movable to one of a plurality of positions;
a single rotational position sensor which is coupled to said motor, continuously monitors the exact position of said motor, selectively produces a signal, and includes a power supply which supplies electrical power to said sensor; and
a controller which is coupled to said sensor, receives said signal, is adapted to detect whether said supply of electrical power is interrupted, and at least temporarily prevents said motor from being selectively movable to one of said plurality of positions in response to said receipt of said signal; and wherein said controller receives a shift command and selectively moves the motor to a second one of the said plurality of positions in response to the receipt of the shift command; and wherein said controller determines whether said motor is currently energized and determines whether said electrical power which is supplied to said sensor is interrupted and, based upon said determinations, causes the motor to be railed to the two-wheel drive position and at least temporarily prevents further movement of said motor while determining the existence of a certain power interruption fault.

12. A transfer case shifting assembly comprising:
a motor which is selectively movable to one of a plurality of positions;
a single rotational position sensor which is coupled to said motor, continuously monitors the exact position of said motor, and selectively produces a signal; and
a controller which is coupled to said sensor by at least one wire and capable of sensing a fault within said at least one wire, receives said signal, and at least temporarily prevents said motor from being selectively movable to one of said plurality of positions in response to said receipt of said signal; and wherein said controller receives a shift command and selectively moves the motor to a second one of the said plurality of positions in response to the receipt of the shift command; and wherein said controller determines whether the motor resides within a neutral position while said motor is unenergized and determines whether said signal is erroneous and, based upon said determinations, said controller determines the existence of a certain signal error fault and causes the motor to be railed toward said two-wheel drive position.

13. A transfer case shifting assembly comprising:
a motor which is selectively movable to one of a plurality of positions;
a single rotational position sensor which is coupled to said motor, continuously monitors the exact position of said motor, and selectively produces a signal; and
a controller which is coupled to said sensor by at least one wire and capable of sensing a fault within said at least one wire, receives said signal, and at least temporarily prevents said motor from being selectively movable to one of said plurality of positions in response to said receipt of said signal; and wherein said controller receives a shift command and selectively moves the motor to a second one of the said plurality of positions in response to the receipt of the shift command; and wherein said controller determines whether said motor is energized and whether said signal is erroneous and, based upon said determinations, said controller determines the existence of a certain signal error fault causes the motor to be railed toward said two-wheel drive position.

14. A method for detecting and responding to certain events within a transfer case of a electronic four wheel drive system of the type having a selectively positionable motor which is coupled to a single electrically powered position sensor, said sensor being adapted to sense the position of said motor and to communicate said position to a controller, said method comprising the steps of:
continuously sensing said position of said motor through only said single position sensor;
sensing an error of said sensed position and at least temporarily preventing said motor from moving in response to said sensed error; and
sensing a loss of electrical power to said position sensor and at least temporarily preventing said motor from moving in response to said loss of electrical power.

* * * * *